United States Patent [19]

Tsuchida

[11] Patent Number: 4,674,667
[45] Date of Patent: Jun. 23, 1987

[54] APPARATUS FOR CORRECTING THE LATERAL DISPLACEMENT OF A MOVING METALLIC SHEET

[76] Inventor: Isamu Tsuchida, c/o U Engineering Co. Ltd., 3-13-21 Awaji, Higashiyodogagw-ku, Osaka-shi, Japan

[21] Appl. No.: 810,341

[22] Filed: Dec. 18, 1985

[51] Int. Cl.⁴ .................... B65H 20/02; B65H 23/038; B65H 27/00
[52] U.S. Cl. ..................................................... 226/18
[58] Field of Search .................. 72/127, 419; 226/15, 226/18, 19, 20, 21; 198/840

[56] References Cited

U.S. PATENT DOCUMENTS

| | | |
|---|---|---|
| 2,643,116 | 6/1953 | Hasselquist ........................ 226/19 X |
| 3,116,244 | 12/1963 | Davis et al. ........................ 226/19 X |
| 3,243,978 | 4/1966 | Gowin ............................... 226/15 X |

FOREIGN PATENT DOCUMENTS 954976  4/1964  United Kingdom ................ 226/15

Primary Examiner—E. Michael Combs
Attorney, Agent, or Firm—Larson and Taylor

[57] ABSTRACT

Apparatus for correcting the displacement of a metallic sheet during its travelling comprising: a displacement correcting roll having a shaft, a plurality of rotary rings rotatably put on said shaft at suitable intervals as inclined by the same angle in the same direction and a resilient cylindrical member made of, for example, rubber closely fitted onto said rotary rings; and a control mechanism for rotatably adjusting the position of said shaft in its rotating directions.

The control mechanism is adapted to adjustingly rotate the shaft in such forward or reverse direction as to correct the displacement of a metallic sheet.

8 Claims, 9 Drawing Figures

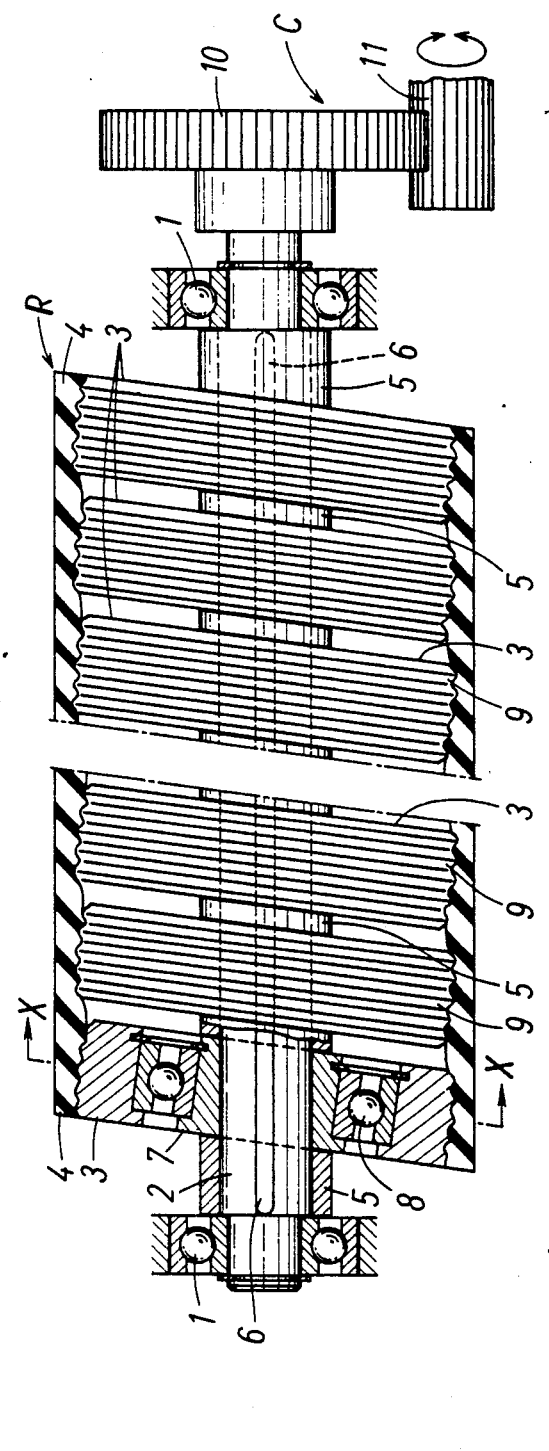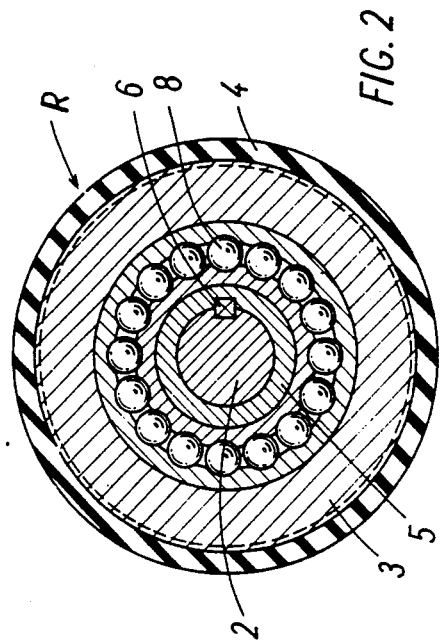

FIG. 7
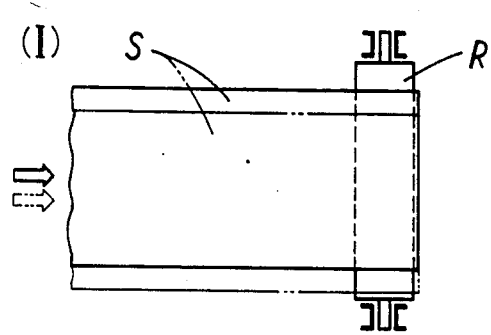
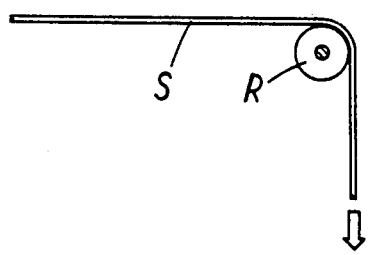
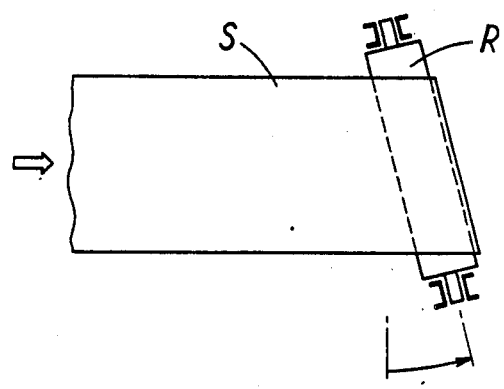

“4,674,667”

APPARATUS FOR CORRECTING THE LATERAL DISPLACEMENT OF A MOVING METALLIC SHEET

BACKGROUND OF THE INVENTION

When manufacturing a metallic sheet continuously, predetermined processes are made on a long metallic sheet while it is travelling. In this travelling passage, a plurality of guide rolls are generally disposed together with a suitable number of displacement correcting rolls for correcting the displacement of a metallic sheet due to its sidemovement. As a displacement correcting roll of this type, there is conventionally known, for example, a roll R schematically shown in FIG. 7 (I) to (III). The roll R is rotatably supported by a shaft and is swingable with one end of the rotary shaft serving as a fulcrum. If a metallic sheet S which windingly travels on the roll R exhibits sidemovement and is displaced to the position shown by chain lines in FIG. 7 (I), the roll R is adapted to swing at its free end in a predetermined direction to restore the sheet S to a correct position to prevent the sheet S from coming off from the roll R.

As discussed hereinbefore, the displacement of the metallic sheet S is corrected by swingingly inclining the roll R. However, the inclination of the roll R exerts tension to the sheet S at its displaced side. Such tension causes the sheet S at its displaced side to be stretched, thereby to disadvantageously lower the quality of the metallic sheet.

Further, in order to swing the roll R, a sufficient space and a peculiar swing device are required. The entire displacement correcting apparatus therefore becomes large-sized, costing a great deal. Moreover, such roll R is slow in correcting action and lacks a speedy reaction.

SUMMARY OF THE INVENTION

The present invention relates to improvements in apparatus for correcting the displacement of a metallic sheet during its travelling.

It is a main object of the present invention to provide apparatus for correcting the displacement of a metallic sheet during its travelling, which can smoothly correct the displacement of a metallic sheet to restore it to a correct travelling position without exerting tension on the metallic sheet due to the swing of a roll as in the prior art, thereby to prevent the metallic sheet from being unevenly stretched, such correction being made with a structure much compact and less expensive as compared with a conventional apparatus.

It is another object of the present invention to provide apparatus for correcting the displacement of a metallic sheet during its travelling with such simple operation as to rotate the shaft of a roll to adjust its position in its rotating directions.

The apparatus for correcting the displacement of a metallic sheet during its travelling in accordance with the present invention comprises:

a displacement correcting roll having a shaft, a plurality of rotary rings rotatably put on said shaft at suitable intervals as inclined by the same angle in the same direction and a resilient cylindrical member made of, for example, rubber closely fitted on said rings; and a control mechanism for adjusting the position of said shaft in its rotating directions by rotating said shaft in such forward or reverse direction as to correct the displacement of a metallic sheet.

According to the apparatus of the present invention, the outer peripheral surface of the roll or the outer peripheral surface of the resilient cylindrical member put on the rotary rings is adapted to be rotated in the same direction as that of the rotary rings to be inclinedly rotated. Accordingly, when the roll on which a metallic sheet windingly travels, is rotated along with the travelling of the metallic sheet, the metallic sheet is guided in a direction in which the rotary rings are inclined, by the contact frictional resistance of the resilient cylindrical member with respect to the metallic sheet.

The guide direction of the metallic sheet by the roll is determined by the position of the shaft of the roll on which the sheet windingly travels. It is therefore possible to adjust the guide direction of the sheet by rotating the roll shaft to adjust its position in its rotating directions.

According to the present invention, if a metallic sheet exhibits sidemovement and is displaced during its travelling, such displacement can securely be corrected simply by rotating the roll shaft in such direction as to correct the displacement.

According to the present invention, when correcting the displacement of a metallic sheet, the roll is not swung as done in a displacement correcting roll of the prior art. Tension due to the swing of the roll is therefore not exerted to a metallic sheet to prevent the same to be unevenly stretched, thereby to produce a metallic sheet of a high quality. Moreover, according to the present invention, the displacement correcting operation can be made in a small space to permit the apparatus to be compacted, thereby to advantageously lower the cost of equipment.

BRIEF DESCRIPTION OF THE DRAWINGS

FIG. 1 is a longitudinal section view, with portions omitted, of displacement correcting apparatus in accordance with the present invention.

FIG. 2 is a section view taken along the line X—X in FIG. 1.

FIG. 7 (I) to (III) are schematic views of a conventional displacement correcting roll; (I) and (II) being a plan view and a side view, respectively, illustrating how a metallic sheet travels windingly on the roll, and (III) illustrating how the roll works to correct the displacement of a metallic sheet.

DETAILED DESCRIPTION OF THE PREFERRED EMBODIMENTS

Figure 3:
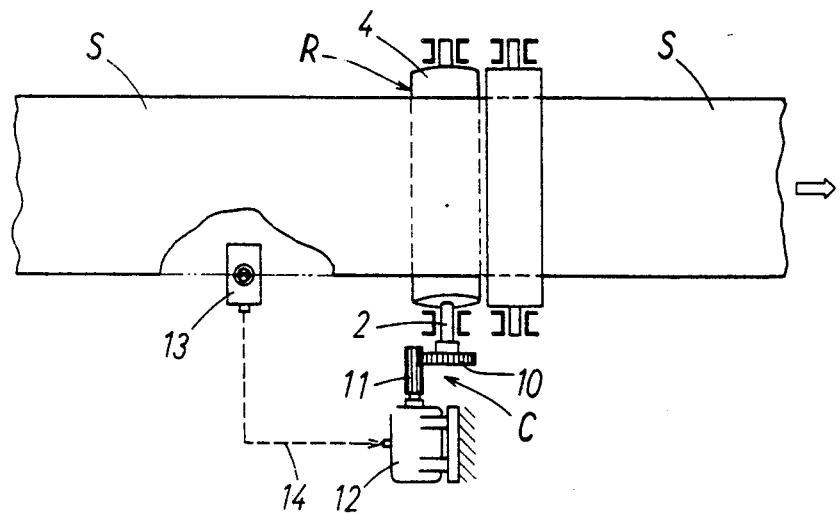
FIG. 3 is a plan view, with portions broken away, illustrating how a metallic sheet windingly travels on the apparatus in FIG. 1.

In an embodiment shown in FIGS. 1 and 2, the apparatus in accordance with the present invention comprises a displacement correcting roll R and a control mechanism C for rotatably adjusting the shaft of the roll R.

The displacement correcting roll R includes a shaft 2 supported by bearings 1, a plurality of rotary rings 3 rotatably put on the shaft 2 at regular intervals as inclined by the same angle in the same direction, and a resilient cylindrical member 4 made of, for example, rubber closely fitted on the rotary rings 3. The rotary rings 3 can be put on the shaft 2 in the following manner. That is, a plurality of spacers 5 having inclined lateral sides are secured to the shaft 2 by keys 6, bearing bases 7 between the spacers 5 are secured as inclined by a predetermined angle to the shaft 2 by the keys 6, and the rotary rings 3 are then put on the bearing bases 7 through bearings 8. Each of the rotary rings 3 has in its outer peripheral surface a plurality of circumferential projections 9, with the use of which the resilient cylindrical member 4 is securely fixed to the rotary rings 3 at their outer peripheral surfaces. As shown in FIG. 1, the projections are of slightly different radii, with the central projection having the largest radius and the outside projections the smallest, so as to provide a rounding of the overall circumferential or peripheral surface.

The control mechanism C for rotatably adjusting the position of the roll shaft 2 in its rotating directions basically includes a gear 10 coaxially mounted on the shaft 2 at its end and a drive gear 11 meshed with the gear 10.

Figure 4:
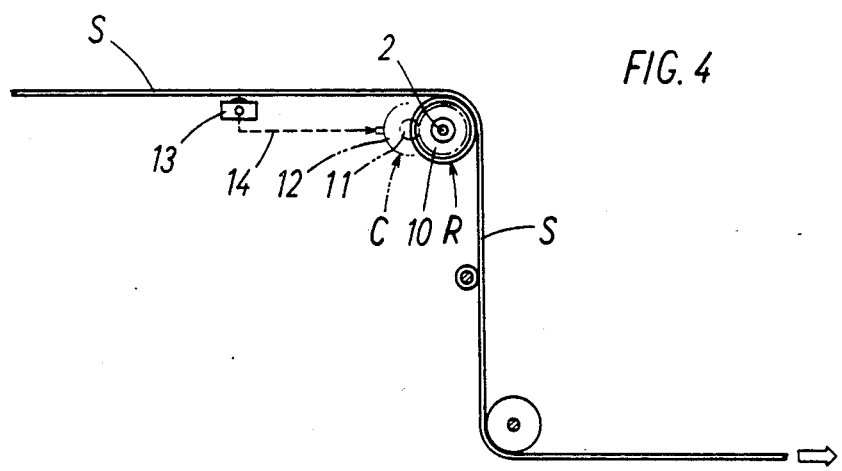
FIG. 4 is a side view of FIG. 3.

In an example shown in FIGS. 3 and 4, the drive gear 11 can be rotated forwardly and reversely by a reversible motor 12. If a metallic sheet S is displaced, a control signal 14 is supplied from a selvedge detector 13 disposed such that its detector element is located on the correct selvedge passing position. Such control signal 14 causes the reversible motor 12 to be automatically rotated in such forward or reverse direction as to correct the displacement of a sheet S. When a sheet S is travelling on a correct position, no control signal 14 is supplied and therefore the motor 12 is not rotated. In this example, the control mechanism C is designed to automatically detect the transverse displacement of a metallic sheet S and subsequently correct such displacement by the gear 10, the drive gear 11, the reversible motor 12 and the selvedge detector 13.

Instead of the automatic control type above-mentioned, this control mechanism C can be of the manual control type, in which, if the operator watching the selvedge position of a travelling metallic sheet, notices the displacement of the metallic sheet, he can operate a rotary wheel (not shown) at the drive gear 11 so as to rotatably adjust the shaft 2.

The following description will discuss how to correct the displacement of a metallic sheet by the displacement correcting roll R constructed as above-mentioned.

The outer peripheral surface of the roll R or the outer peripheral surface of the resilient cylindrical member 4 closely fitted on the rotary rings is rotated in the same direction as that of the rotary rings 3 to be inclinedly rotated.

Accordingly, when the roll R on which a metallic sheet S windingly travels, is rotated along with the travelling of the metallic sheet S, the sheet S is guided in a direction in which the rotary rings 3 are inclined, by the contact frictional resistance of the resilient cylindrical member 4 with respect to the metallic sheet S.

The guide direction of the metallic sheet S by the roll R is determined by the position of the shaft 2 of the roll R on which the sheet S windingly travels. It is therefore possible to adjust the guide direction of the sheet S by rotating the roll shaft 2 to adjust its position in its rotating directions.

FIGS. 3 and 4 schematically illustrate that a metallic sheet S travels on a correct position. In this state, the shaft 2 is positioned such that the sheet S is guided with the same angle in the opposite directions, respectively, when the sheet S is sent to and sent out from the roll R. At this time, the selvedge detector 13 does not supply a signal to the motor 12, so that the motor 12 is not rotated. The roll R continues to effect such guiding operation.

Figure 5:
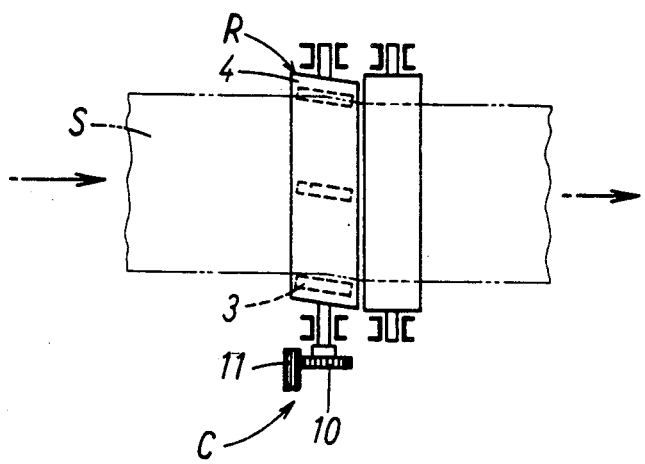
FIGS. 5 and 6 are views illustrating how the apapratus of the present invention works to correct the displacement of a metallic sheet.

As schematically shown in FIG. 5, if the metallic sheet S is displaced in one direction or to the left side in FIG. 5, the selvedge detector 13 detects such displacement and supplies a control signal 14. The motor 12 is then rotated in a predetermined direction to rotatably adjust the position of the shaft 2 through the drive gear 11 and the gear 10. The outer peripheral surface of the resilient cylindrical member 4 which comes in contact with the sheet S is therefore changed in rotation direction so as to guide the sheet S toward the right direction. The sheet S as contacted with the resilient cylindrical member 4 is therefore guided to the right side and is subsequently moved to a correct position.

Figure 6:
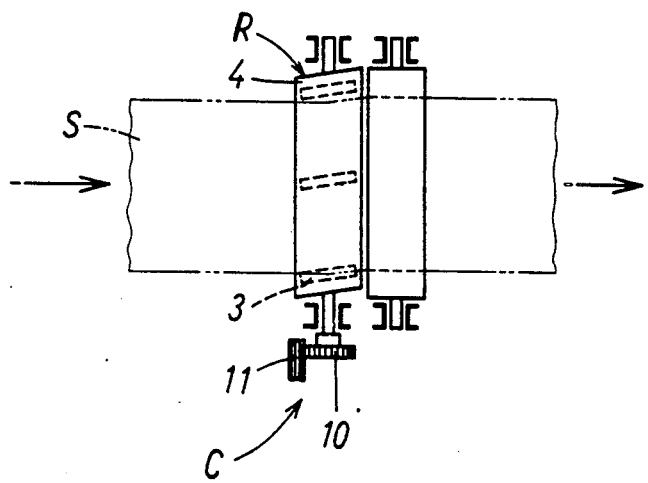

On the other hand, if the sheet S is displaced to the right side as schematically shown in FIG. 6, a control signal 14 from the selvedge detector 13 causes the motor 12 to be rotated in the opposite direction to the direction mentioned in connection with FIG. 5. Then, the shaft 2 is accordingly rotated. The outer peripheral surface of the resilient cylindrical member 4 which comes in contact with the sheet S, is therefore changed in rotation direction so as to guide the sheet S toward the left direction.

The sheet S as contacted with the resilient cylindrical member 4 is therefore guided to the left side and is subsequently moved to the correct position.

As discussed hereinbefore, correction of the displacement of a metallic sheet during its travelling can be achieved smoothly and securely.

The embodiment above-mentioned has been discussed and illustrated only by way of example. The present invention is therefore not limited to this embodiment, and modifications and variations thereof should be included in the present invention without departing from the spirit and the scope of the following claims.

What we claim is:

1. Apparatus for correcting the lateral displacement of a metallic sheet during the travel thereof, said apparatus comprising:
   a displacement correcting roll comprising a shaft, a plurality of rotary rings rotatably mounted on said shaft at spaced intervals therealong and inclined at the same angle in the same direction with respect to said shaft and a resilient cylindrical member closely fitted around said rotary rings; and
   a control means for adjusting the position of said shaft with respect to the rotating directions thereof so as to provide rotating of said shaft in such forward or reverse direction as necessary to correct the displacement of a metallic sheet supported on the resilient cylindrical member of the displacement correcting roll.

2. Apparatus as set forth in claim 1, wherein each of the rotary rings of the displacement correcting roll has in the outer peripheral surface thereof a plurality of circumferential projections.

3. Apparatus as set forth in claim 1, wherein the control mechanism has a gear coaxially mounted on the shaft at its end and a drive gear meshed with said gear.

4. Apparatus as set forth in claim 1, wherein the control mechanism is of the automatic control type.

5. Apparatus as set forth in claim 1, wherein the control mechanism is of the manual control type.

6. Apparatus as set forth in claim 2 wherein the circumferential projections of are different radii and define a rounded peripheral surface.

7. Apparatus as set forth in claim 1 wherein the outer peripheral surface of said rotary rings is rounded.

8. Apparatus as set forth in claim 1 wherein said cylindrical member is made of rubber.

* * * * *